US012793331B2

(12) United States Patent
Wang et al.

(10) Patent No.: US 12,793,331 B2

(45) Date of Patent: Nov. 10, 2026

(54) IMAGE RENDERING METHOD, APPARATUS, ELECTRONIC DEVICE AND STORAGE MEDIUM

(71) Applicants: LEMON INC., Grand Cayman (KY); BEIJING ZITIAO NETWORK TECHNOLOGY CO., LTD., Beijing (CN)

(72) Inventors: Peng Wang, Beijing (CN); Guangwei Wang, Beijing (CN); Zichuan Wang, Beijing (CN)

( * ) Notice: Subject to any disclaimer, the term of this patent is extended or adjusted under 35 U.S.C. 154(b) by 141 days.

(21) Appl. No.: 18/434,499

(22) Filed: Feb. 6, 2024

(65) Prior Publication Data

US 2024/0265626 A1 Aug. 8, 2024

(30) Foreign Application Priority Data

Feb. 6, 2023 (CN) ......................... 202310100336.4

(51) Int. Cl.

*G06T 15/50* (2011.01)
*G06T 15/60* (2006.01)
*G06T 17/20* (2006.01)

(52) U.S. Cl.

CPC ............ *G06T 15/506* (2013.01); *G06T 15/50* (2013.01); *G06T 15/60* (2013.01); *G06T 17/20* (2013.01); *G06T 2210/04* (2013.01)

(58) Field of Classification Search

CPC ....... G06T 15/506; G06T 15/50; G06T 15/60; G06T 17/20; G06T 2210/04

See application file for complete search history.

(56) References Cited

U.S. PATENT DOCUMENTS 10,665,011 B1 * 5/2020 Sunkavalli ............. G06N 3/084
10,957,026 B1 * 3/2021 Zhang ....................... G06T 5/60
11,574,437 B2 * 2/2023 Hou ........................ G06T 15/20
11,636,656 B1 * 4/2023 Casaburo .................. G06T 7/12
345/419

(Continued)

FOREIGN PATENT DOCUMENTS

CN 112215936 1/2021
CN 112330788 2/2021

(Continued)

OTHER PUBLICATIONS

Li et al., "Inverse Rendering for Complex Indoor Scenes: Shape, Spatially-Varying Lighting and SVBRDF from a Single Image," In Proceeding of the 2020 IEEE/CVF Conference on Computer Vision and Pattern Recognition (CVPR), Jun. 13-19, 2020, Seattle, WA, USA, retrieved Apr. 2024, retrieved from URL<https://cseweb.ucsd.edu//~viscomp/projects/CVPR20InverseIndoor/>, 4 pages.

*Primary Examiner* — Abderrahim Merouan

(74) *Attorney, Agent, or Firm* — Fish & Richardson P.C.

(57) ABSTRACT

Provided are image rendering methods and one or more apparatus, electronic devices, and storage media. One of the methods includes determining an image to be rendered, wherein a virtual object is newly added to the image to be rendered; determining local lighting information and global lighting information corresponding to the image to be rendered; and projecting and rendering the virtual object in the image to be rendered by combining the local lighting information with the global lighting information.

17 Claims, 5 Drawing Sheets

(56) References Cited

U.S. PATENT DOCUMENTS

| | | | | |
|---|---|---|---|---|
| 2012/0051628 | A1* | 3/2012 | Noguchi | G06V 10/757<br>382/159 |
| 2015/0205445 | A1* | 7/2015 | Pradeep | G06F 3/042<br>345/175 |
| 2016/0343161 | A1* | 11/2016 | Paladini | G06T 15/506 |
| 2021/0158597 | A1* | 5/2021 | Hagland | A63F 13/355 |
| 2022/0254121 | A1* | 8/2022 | Xu | G06T 17/20 |
| 2023/0147759 | A1* | 5/2023 | Steinbrücker | G06T 19/00<br>345/419 |
| 2023/0162338 | A1* | 5/2023 | Sun | H04N 13/122<br>382/106 |
| 2023/0252764 | A1* | 8/2023 | Gilpin | G06V 10/774<br>382/157 |

FOREIGN PATENT DOCUMENTS

| | | | | |
|---|---|---|---|---|
| CN | 113807398 | A * | 12/2021 | G06F 18/2411 |
| CN | 114596589 | A * | 6/2022 | G06N 3/045 |
| KR | 100879536 | B1 * | 1/2009 | H04N 23/76 |

* cited by examiner

IMAGE RENDERING METHOD, APPARATUS, ELECTRONIC DEVICE AND STORAGE MEDIUM

CROSS-REFERENCE OF RELATED APPLICATIONS

This application is based on and claims the benefit of China Patent Application 202310100336.4 filed on Feb. 6, 2023, entitled as "IMAGE RENDERING METHOD, APPARATUS, ELECTRONIC DEVICE AND STORAGE MEDIUM." The disclosure of the foregoing application is incorporated here by reference.

FIELD OF THE INVENTION

Embodiments of the disclosure relate to image processing technology, in particular to an image rendering method, apparatus, electronic device and storage medium.

BACKGROUND

With continuous development of image technology, a virtual object can usually be added to an image, for example, a virtual object such as a cartoon character and the like can be inserted into an image for display.

SUMMARY OF THE INVENTION

In a first aspect, an embodiment of the present disclosure provides an image rendering method, including:

- determining an image to be rendered, wherein a virtual object is newly added to the image to be rendered;
- determining local lighting information and global lighting information corresponding to the image to be rendered; and
- projecting and rendering the virtual object in the image to be rendered by combining the local lighting information with the global lighting information.

In a second aspect, an embodiment of the present disclosure also provides an image rendering apparatus, including:

- an image determination module configured to determine an image to be rendered, wherein a virtual object is newly added to the image to be rendered;
- a lighting determination module configured to determine local lighting information and global lighting information corresponding to the image to be rendered; and
- an image rendering module configured to project and render the virtual object in the image to be rendered by combining the local lighting information with the global lighting information.

In a third aspect, an embodiment of the present disclosure also provides an electronic device, which includes:

- at least one processor; and
  - a memory communicatively connected to the at least one processor;
  - wherein, the memory stores a computer program executable by the at least one processor, and the computer program, when executed by the at least one processor, causes the at least one processor to implement the image rendering method as described in any one of the above embodiments.

In a fourth aspect, an embodiment of the present disclosure also provides a computer-readable medium storing computer instructions, which, when executed by a processor, cause implementation of the image rendering method as described in any one of the above embodiments.

It should be understood that what is described in this section is not intended to identify key or important features of embodiments of the present disclosure, nor intended to limit the scope of the disclosure. Other features of the present disclosure will be readily understood from the following description.

BRIEF DESCRIPTION OF THE DRAWINGS

The above and other features, advantages, and aspects of embodiments of the present disclosure will become more apparent by referring to the following detailed description when taken in conjunction with the accompanying drawings. Throughout the drawings, the same or similar reference numerals indicate the same or similar elements. It should be understood that the drawings are schematic, and the original and elements are not necessarily drawn to scale.

DETAILED DESCRIPTION

Figure 1:
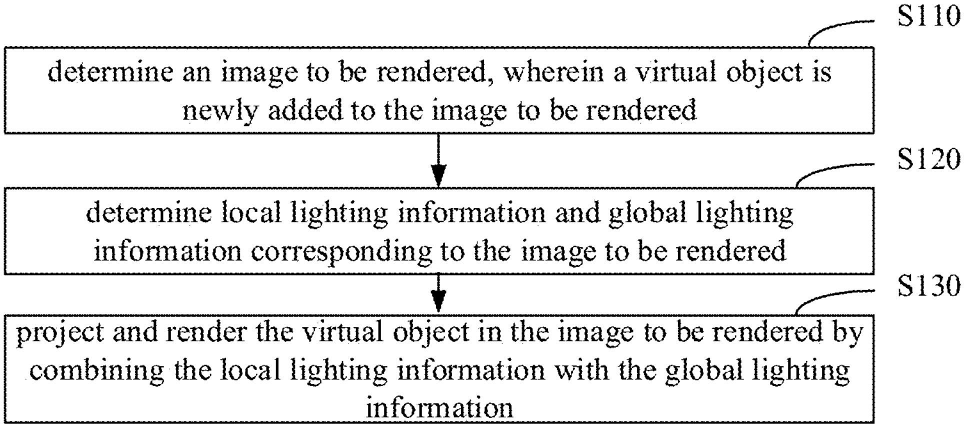
FIG. 1 is a flowchart of an image rendering method provided by an embodiment of the present disclosure.

Embodiments of the present disclosure will be described in more detail below with reference to the accompanying drawings. Although some embodiments of the present disclosure are shown in the drawings, it should be understood that the present disclosure can be embodied in various forms and should not be construed as limited to the embodiments set forth here, but rather, these embodiments are only provided for a more thorough and complete understanding of the present disclosure. It should be understood that the drawings and embodiments of the present disclosure are only used for illustrative purposes, instead of being used to limit the protection scope of the present disclosure.

It should be understood that the steps described in the method embodiments of the present disclosure may be performed in a different order and/or in parallel. Furthermore, method embodiments may include additional steps and/or omit performing the illustrated steps. The scope of the present disclosure is not limited in this respect.

As used herein, the term "including" and its variants are open-ended including, that is, "including but not limited to". The term "based on" means "at least partially based on". The term "an embodiment" means "at least one embodiment"; the term "another embodiment" means "at least one other embodiment"; The term "some embodiments" means "at least some embodiments". Relevant definitions of other terms will be given in the following description.

It should be noted that the concepts of "first" and "second" mentioned in this disclosure are only used to distinguish different devices, modules, or units, instead of being used to limit the order or interdependence of functions performed by these devices, modules, or units.

It should be noted that the modifications of "a" and "a plurality" mentioned in this disclosure are schematic rather than limiting, and those skilled in the art should understand that unless clearly indicated in the context, otherwise, they should be understood as "one or more".

Names of messages or information exchanged among multiple devices in embodiments of the present disclosure are only used for illustrative purposes, instead of being used to limit the scope of these messages or information.

It can be understood that before using the technical solutions disclosed in various embodiments of this disclosure, the type, usage scope, usage scenarios, etc. of personal information involved in the present disclosure shall be notified to a user and be authorized by the user in an appropriate way according to relevant laws and regulations.

For example, in response to receiving an active request from a user, prompt information is sent to the user to clearly remind the user that the operation requested by the user will require obtaining and using the user's personal information. Therefore, the user can autonomously choose whether to provide personal information to software or hardware such as electronic devices, applications, servers, or storage media that perform the operations of the technical schemes of the present disclosure according to the prompt information.

As an optional but non-limiting implementation, in response to receiving the user's active request, the way to send the prompt information to the user can be, for example, a pop-up window, in which the prompt information can be presented in text. In addition, the pop-up window can also carry a selection control for the user to choose "agree" or "disagree" with respect to providing personal information to the electronic device.

It can be understood that the above procedure of notifying and obtaining user authorization is only schematic, and does not limit the implementation of the present disclosure. Other ways to meet relevant laws and regulations can also be applied to the implementation of the present disclosure.

It can be understood that the data involved in the technical schemes of the present disclosure (including but not limited to the data itself, acquisition or usage of data) shall comply with the requirements of corresponding laws, regulations, and relevant specifications.

In order to enhance authenticity of the virtual object inserted into the image, it is usually possible to render a shadow of the virtual object in the image by simulating lighting, however, after testing, it is found that the lighting variations on the random image are inconsistent in different locations, which may cause inconsistent shadow effects, resulting in low fidelity of the virtual object inserted into the image, which cannot achieve a better picture realism.

In view of this, the present disclosure provides an image rendering method, apparatus, electronic device, and storage medium, so as to ensure consistency of lighting variations at different locations when a shadow of a virtual object is rendered in an image.

FIG. 1 is a flow chart of an image rendering method provided by an embodiment of the present disclosure. The embodiment of the present disclosure is suitable for rendering and displaying a virtual object, such as a cartoon character or the like, that is newly added into an image, the image rendering method can be implemented by an image rendering apparatus, which can be implemented in the form of software and/or hardware, or alternatively, by an electronic device, which can be a mobile terminal, a PC terminal, or a server. As shown in FIG. 1, the image rendering method of the present embodiment may include, but not limited to, the following processes:

S110: Determine an image to be rendered, and add a virtual object to the image to be rendered.

An apparatus for executing the image rendering method provided by the embodiment of the present disclosure can be integrated in an application software supporting the image rendering function, and the application software can be installed in an electronic device. The application software can be a kind of software for image/video processing, and specific application software i not described in detail here, as long as they can realize the image/video processing. It can also be a specially developed application to be implemented in a software for adding image rendering, or be integrated into a corresponding page with the image rendering function, so that the image rendering can be realized through the page integrated in the PC.

When a virtual object is added into any image, for example, a virtual object for making cartoon characters or the like is inserted into an image for display, in order to improve the real fidelity of the virtual object inserted in the image, it is usually necessary to simulate lighting to project the virtual object in the image. The newly added virtual object can be of a three-dimensional structure.

S120: Determine local lighting information and global lighting information corresponding to the image to be rendered.

Considering that the virtual object needs to have a certain similarity with the ambient lighting in the image at different locations in the image, it is necessary to realize consistency of lighting variations at different locations in the image as much as possible. In the scheme of the present disclosure, when performing projection and rendering on the image to be rendered with a newly added virtual object, the corresponding local lighting information from Spherical Gaussian distribution (SG) local light estimation and global lighting information from high dynamic rendering HDR are introduced concurrently.

Among them, local lighting can consider the lighting effect of a light source on the surface of the virtual object in the image to be rendered, the local lighting information can include lighting information about each pixel in the image to be rendered, each pixel has the same size, and respective pixels can form the image to be rendered. Global lighting can consider the lighting effect of interaction between all surfaces in the environment and the light source, and the lighting information can include light intensity and light direction.

S130: Project and render the virtual object in the image to be rendered by combining the local lighting information corresponding to the image to be rendered with the global lighting information.

For the global lighting information obtained by global lighting estimation, there are many high-frequency details in the global lighting information, which can ensure a consistency of lighting over a wide range in the image to be rendered, but the lighting variations are less. For the local lighting information obtained by local light estimation, the local lighting information can realize obvious lighting variations at different locations in the image to be rendered, but the lighting consistency is poor. Here, the local lighting information and the global lighting information corresponding to the image to be rendered can be combined together to form a joint lighting information, so that the lighting corresponding to the joint lighting information can not only ensure the consistency of lighting over a wide range, but also keep obvious lighting variation differences at different locations, so that the lighting vibration from re-lighting on the virtual object in the image to be rendered becomes smooth and consistent.

As an optional but non-limiting implementation, projecting and rendering virtual objects in the image to be rendered by combining local lighting information with global lighting information may include the following processes:

utilizing Gamma correction to combine local lighting information with global lighting information to obtain joint lighting information to be used for the image to be rendered, and projecting and rendering virtual objects in the image to be rendered by using the joint lighting information, so as to generate the shadow of the virtual object in the image to be rendered.

Figure 2:
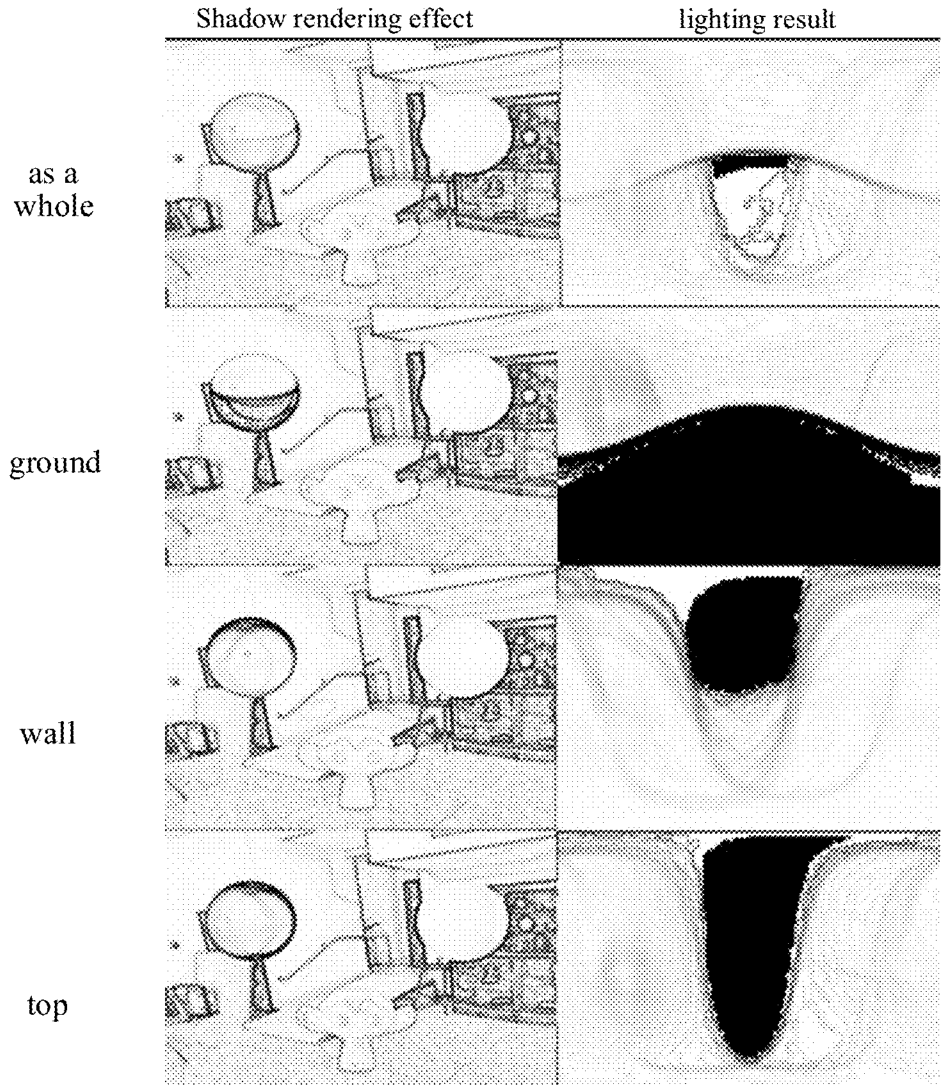
FIG. 2 is a schematic diagram of the effect of projecting and rendering a virtual object provided by an embodiment of the present disclosure.

Referring to FIG. 2, the left-side figure shows the rendering results of projecting the virtual objects in the image to be rendered by means of combination of local lighting information and global lighting information, and the right-side figure shows, after the virtual objects in the image to be rendered are projected and rendered by means of combination of local lighting information and global lighting information, the lighting/illumination results from the whole, ground area, wall area and top ceiling area respectively. It can be seen that the lighting/illumination results of the ground area, wall area and top ceiling area have good consistency and the lighting vibration becomes smoother. Projecting and rendering a virtual object by combining local lighting information with global lighting information is equivalent to projecting the virtual object by using the global lighting information as a whole background, and then incorporating the projection of the virtual object based on the local lighting information in the whole background to reflect the change of projection, after combining the local lighting information with global lighting information through gamma correction, the joint lighting information can be used to project the virtual object, which reduces the drastic lighting variation, makes the lighting variation at different locations after illumination more continuous and consistent, and at the same time reflects some differences in lighting variations at different locations.

In the technical scheme according to an embodiment of the present disclosure, by determining the local lighting information and the global lighting information about an image to be rendered with a newly added virtual object, and combining the local lighting information and the global lighting information to project and render the virtual object in the image to be rendered, it is possible to not only ensure the consistency of lighting over a wide range, but also maintain obvious lighting variations at different locations, thus alleviating a problem of particularly drastic lighting variations, meanwhile there are some differences in lighting variations at different locations, so as to alleviate the problem of inconsistent shadow effects as much as possible, improve the fidelity of the inserted virtual object, and achieve a better picture realism.

Figure 3:
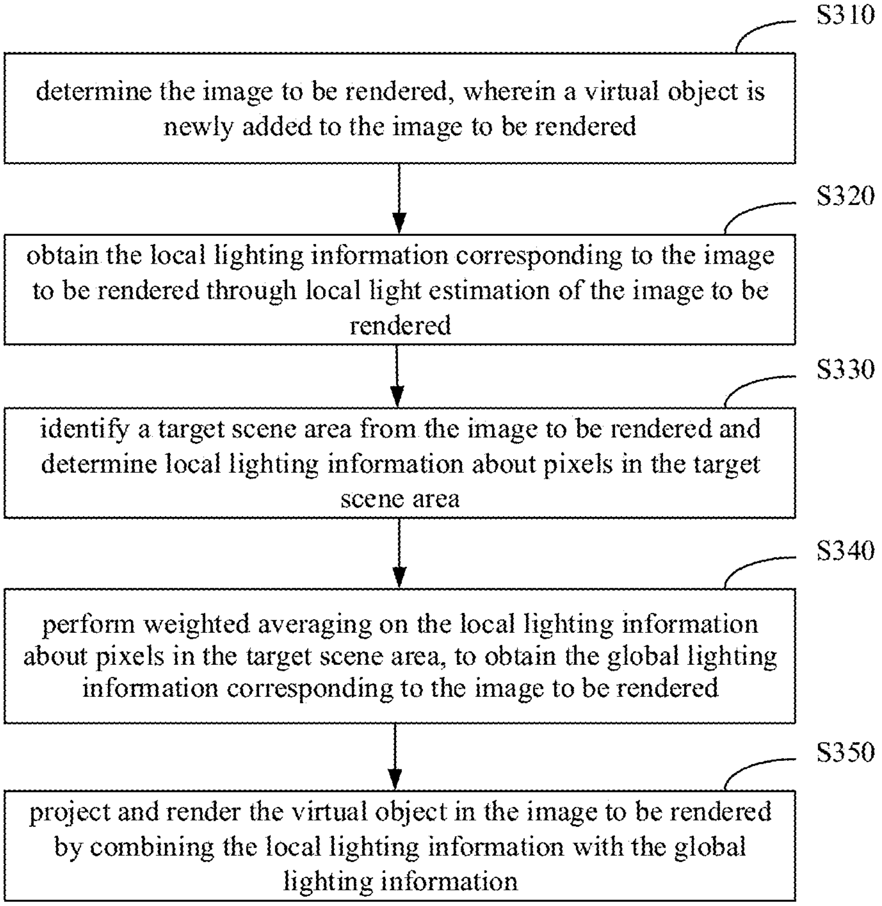
FIG. 3 is a flowchart of another image rendering method provided by an embodiment of the present disclosure.

FIG. 3 is a schematic flow chart of another image rendering method provided by an embodiment of the present disclosure. The technical scheme of the present embodiment further optimizes the process of determining the local lighting information and the global lighting information corresponding to the image to be rendered in the aforementioned embodiment, and the present embodiment can be combined with various optional schemes in one or more of the aforementioned embodiments. As shown in FIG. 3, the image rendering method of the present embodiment may include, but not limited to, the following processes:

S310: Determine the image to be rendered, wherein a virtual object is newly added to the image to be rendered.

Figure 4:
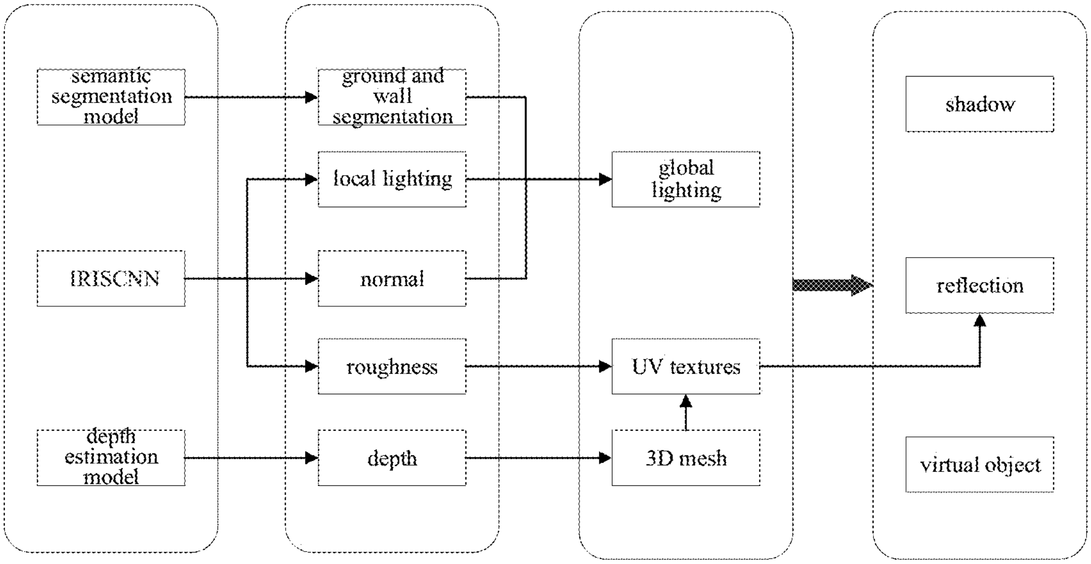
FIG. 4 is a schematic frame diagram of an image rendering method provided by an embodiment of the present disclosure.

S320: Obtain the local lighting information corresponding to the image to be rendered through local light estimation of the image to be rendered;

As shown in FIG. 4, IRISCNN can be used for spherical Gaussian distribution local light estimation, to obtain the local light information corresponding to the image to be rendered.

S330: Identify a target scene area from the image to be rendered and determine local lighting information about pixels in the target scene area.

Optionally, as shown in FIG. 4, the image to be rendered can be segmented by using a semantic segmentation model, and the image area of the image to be rendered can be segmented into different scene areas, for example, the image area in the image to be rendered can be segmented into a wall area and a ground area. Because different scene areas in the real environment reflect the global lighting differently, for example, the local lighting for the ground area can usually reflect the global lighting directly after simple adjustment, while the local lighting for the wall area requires complex calculation to reflect the global lighting, therefore, a target scene area that meets the requirements can be screened from the segmented scene areas. Wherein, the target scene area can include a ground area, a wall area or a top ceiling area segmented according to different scenes in the image to be rendered. In addition, the local lighting information corresponding to pixels in the target scene area of the image to be rendered can also be extracted from the local lighting information corresponding to the image to be rendered.

S340: Perform weighted averaging on the local lighting information about pixels in the target scene area, to obtain the global lighting information corresponding to the image to be rendered.

Referring to FIG. 4, IRISCNN can be used for normal estimation to obtain normal information corresponding to pixels in the image to be rendered, and then global light estimation can be performed according to local lighting information about pixels in the target scene area and normal information corresponding to pixels in the target scene area of the image to be rendered, so that the global lighting information corresponding to the image to be rendered can be obtained.

The light corresponding to the local lighting information is usually diffused, if the lighting corresponding to the local lighting information is directly used to project the virtual object, it will be found that there is no shadow or only a very weak shadow for the virtual object in the image, even if there is a weak shadow, it does not match the virtual object. Shadow is useful for visual perception of a three-dimensional virtual object in the environment, for example, when a virtual object is placed on the ground, there exists a corresponding shadow, which can play a role in improving the real fidelity for the visual perception of the virtual object.

In order to better render the shadow of the virtual object in the projection, when the global lighting is configured for the image to be rendered, a matching global parallel light lighting can be designed and added. In order to design the global parallel light, the local lighting information about pixels in the target scene area can be averaged weighted, to generate the global lighting information corresponding to the image to be rendered in the direction of the global parallel light.

As an optional but non-limitative implementation, perform weighted averaging on the local lighting information about pixels in the target scene area, to obtain the global lighting information corresponding to the image to be rendered, may include but not limited to the following steps A1-A3:

Step A1, Determine local lighting directions for the pixels in the target scene area from the local lighting information about the pixels in the target scene area;

Step A2: Perform weighted averaging on the local lighting directions for pixels in the target scene area to obtain a global average lighting direction corresponding to the image to be rendered.

Step A3: Determine the global lighting information corresponding to the image to be rendered according to the global average lighting direction corresponding to the image to be rendered, wherein the global lighting information is used for indicating generation of a global parallel light along the global average lighting direction.

After the image area of the image to be rendered has been segmented into different scene areas through area segmentation for the image to be rendered, the local lighting directions for pixels in the target scene area can be screened and counted, and then the screened local lighting directions for each pixel in the target scene area can be averaged in direction, so that a global average lighting direction for the image to be rendered can be obtained. In the global average lighting direction corresponding to the image to be rendered, global lighting information with global parallel light in the global average lighting direction can be generated.

Optionally, the performing weighted averaging on the local lighting directions for pixels in the target scene area to obtain a global average lighting direction corresponding to the image to be rendered may include the following processes: determining a pixel identification probability in the target scene area, wherein the pixel identification probability is a probability that a pixel is identified as a pixel belonging to the target scene area (the pixel identification probability can be a prediction probability that a pixel is identified as a pixel belonging to the target scene area when the scene area segmentation is performed); and performing weighted averaging on the local lighting directions for pixels in the target scene area according to the pixel identification probability in the target scene area, to obtain the global average lighting direction corresponding to the image to be rendered.

By adopting the above optional mode, by estimating global lighting information that can generate a global parallel light in the global average lighting direction, when the virtual object in the image to be rendered is projected and rendered, the global parallel light can provide a shadow appearance that is with consistent lighting and is true, so as to avoid reduction of the fidelity of the virtual object newly added to the image to be rendered due to there existing no shadow in the image or there existing very weak shadow in the image.

S350: Projecting and rendering the virtual object in the image to be rendered by combining the local lighting information with the global lighting information.

In the technical scheme according to an embodiment of the present disclosure, by determining the local lighting information and the global lighting information about an image to be rendered with a newly added virtual object, and combining the local lighting information and the global lighting information to project and render the virtual object in the image to be rendered, it is possible to not only ensure the consistency of lighting over a wide range, but also maintain obvious lighting variations at different locations, thus alleviating a problem of particularly drastic lighting variations, meanwhile there are some differences in lighting variations at different locations, so as to alleviate the problem of inconsistent shadow effects as much as possible, improve the fidelity of the inserted virtual object, and achieve a better picture realism. Furthermore, by providing the global parallel light, the shadow effect when projecting the virtual objects can be further enhanced.

Figure 5:
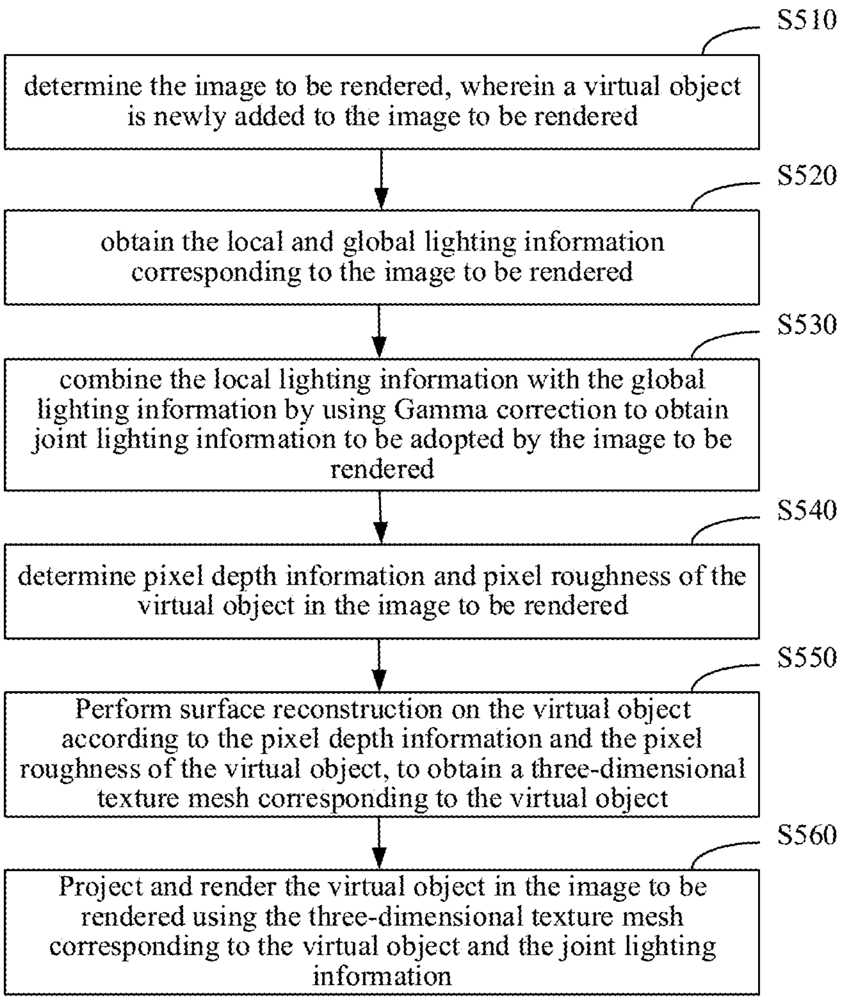
FIG. 5 is a flowchart of another image rendering method provided by the embodiment of the present disclosure.

FIG. 5 is a flowchart of another image rendering method provided by an embodiment of the present disclosure. Based on the above embodiments, the technical scheme of the present embodiment further optimizes the process of projection and rendering of the virtual object in the image to be rendered according to the joint lighting information in the above embodiment. The present embodiment can be combined with various alternatives in one or more of the above embodiments. As shown in FIG. 5, the image rendering method of the present embodiment may include, but not limited to, the following processes:

S510: Determine the image to be rendered, wherein a virtual object is newly added to the image to be rendered.

S520: Obtain local lighting information and global lighting information corresponding to the image to be rendered.

S530: Combine the local lighting information with the global lighting information by using Gamma correction to obtain joint lighting information to be adopted by the image to be rendered.

S540: Determine pixel depth information and pixel roughness of the virtual object in the image to be rendered.

Referring to FIG. 4, a depth estimation model can be used to perform depth estimation for pixels of the virtual object in the image to be rendered, and the pixel depth information about corresponding pixels of the virtual object can be obtained. Among them, the pixel depth information is used to describe a distance between the corresponding pixel of the virtual object in the image to be rendered and a shooting source. IRISCNN can also be used to perform roughness estimation for a surface of the virtual object in the image to be rendered, and the pixel roughness of the corresponding pixels of the virtual object in the image to be rendered can be obtained.

S550: Perform surface reconstruction on the virtual object according to the pixel depth information and the pixel roughness of the virtual object, to obtain a three-dimensional texture mesh corresponding to the virtual object.

Figure 6:
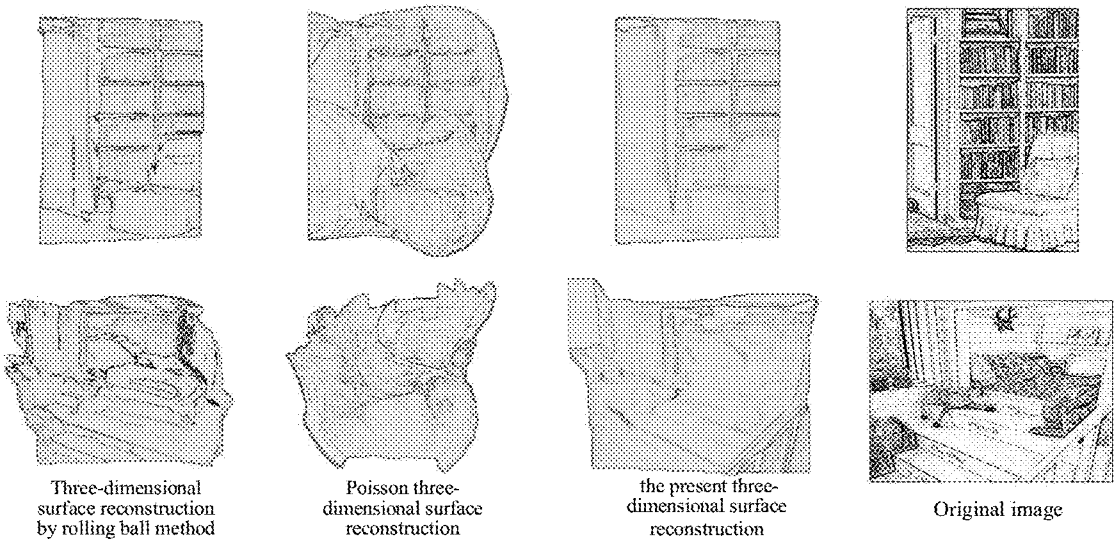
FIG. 6 is a schematic diagram of the principle of three-dimensional mesh generation provided by an embodiment of the present disclosure.

Referring to FIG. 4 and FIG. 6, after the pixel roughness of the corresponding pixels of the virtual object has been obtained, the pixel roughness can be mapped to the pixel texture. In order to realize that a shadow generated by projection of the virtual object inside the image to be rendered conforms to the three-dimensional geometry of the virtual object, that is, to realize that the shadow of the virtual object inside the image to be rendered is aligned with the three-dimensional geometry of the virtual object in the image to be rendered, a smooth three-dimensional mesh can be created for the virtual object through a three-dimensional mesh reconstruction method based on the pixel depth information about the corresponding pixels of the virtual object. Furthermore, the texture mapped by the pixel roughness can be placed on a three-dimensional mesh of the virtual object to obtain the three-dimensional texture mesh corresponding to the virtual object.

Optionally, as shown in FIG. 6, the specific process of generating a smooth three-dimensional mesh by the three-dimensional mesh reconstruction method may include drawing adjacent pixels in corresponding pixels of the virtual objects in the image to be rendered into a triangular plane according to pixel depths through the three-dimensional mesh reconstruction method, and then coupling the drawn triangular planes into a three-dimensional mesh, so that a three-dimensional texture mesh corresponding to the virtual objects in the image to be rendered can be obtained. By adopting the above manner of generating the three-dimensional mesh by using depth, it is possible to avoid loopholes or jumps in some locations as much as possible, while alleviating a problem of edge loss and overlapping when the three-dimensional mesh is generated as much as possible, thus ensuring the continuity of the generated 3D mesh of the virtual object.

S560: Project and render the virtual object in the image to be rendered using the three-dimensional texture mesh corresponding to the virtual object and the joint lighting information.

As an optional but non-limitative implementation, the projecting and rendering the virtual object in the image to be rendered may include applying lighting corresponding to the joint lighting information to the virtual object in the image to be rendered, and projecting on the image to form a shadow of the virtual object.

By combining the three-dimensional texture mesh corresponding to the virtual object, the joint lighting information, and the virtual object in the image to be rendered, it is possible to re-render the virtual object added inside the image to be rendered through illumination with consistent lighting and projected shadows, which not only ensures the implementation of lighting consistency, but also ensures that the shadow clarity and shadow shape of the virtual object are more approximate to the geometric shape of the virtual object in a real scene.

As an optional but non-limitative implementation, the projection and rendering the virtual object in the image to be rendered may further include but not limited to the following steps B1-B2:

Step B1: Determine pixel depth information of the virtual object in the image to be rendered.

B2. Determine and adjust a size matched with the virtual object according to the pixel depth information of the virtual object through a preset virtual object scaling relationship, wherein the preset virtual object scaling relationship is used for recording a correlation relationship between a size of the virtual object in the image and a pixel depth of the virtual object.

Figure 7:
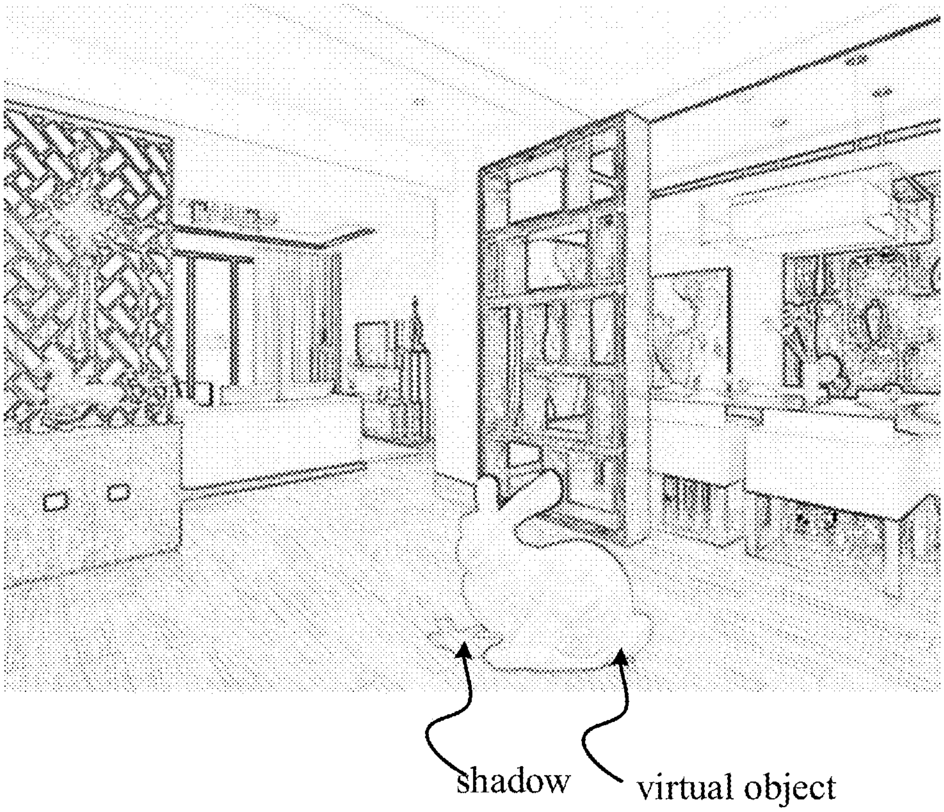
FIG. 7 is a schematic diagram of a virtual object size adjustment provided by an embodiment of the present disclosure.
Figure 8:
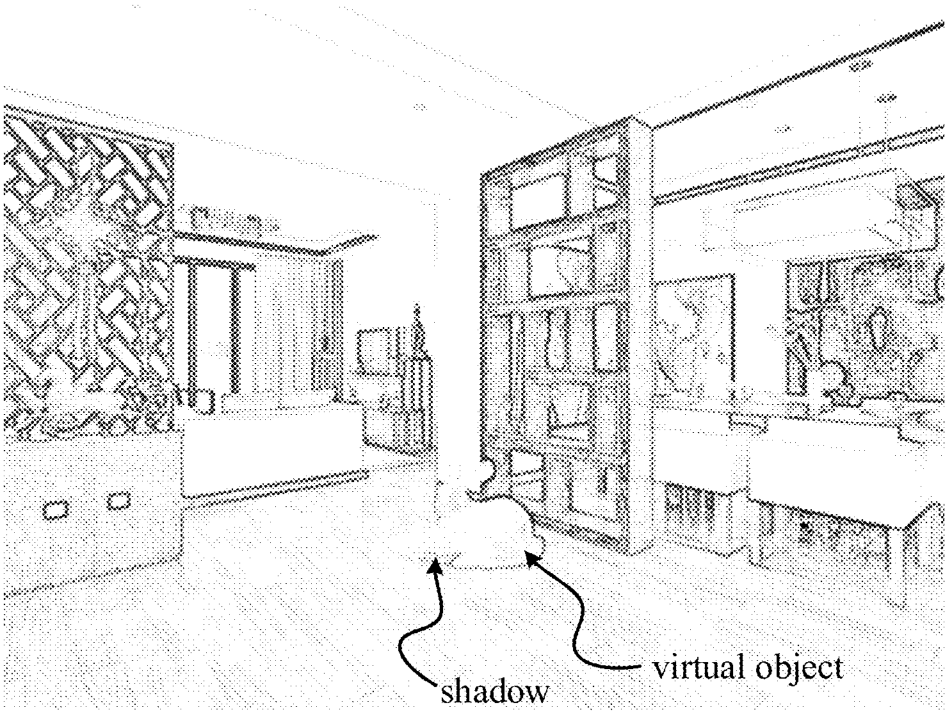
FIG. 8 is a schematic diagram of another virtual object size adjustment provided by an embodiment of the present disclosure.

Referring to FIGS. 7 and 8, in order to automatically adjust the size of the virtual object in the image when projecting the virtual object in the image to be rendered, a rescaling mode of the virtual object size relative to the depth of the virtual object in the image can be preset, which is presented as the preset virtual object scaling relationship here. By obtaining the pixel depth information of the virtual object in the image to be rendered, the corresponding desired size can be found according to the pixel depth information, and the size of the virtual object in the image to be rendered can be adjusted adaptively.

Figure 9:
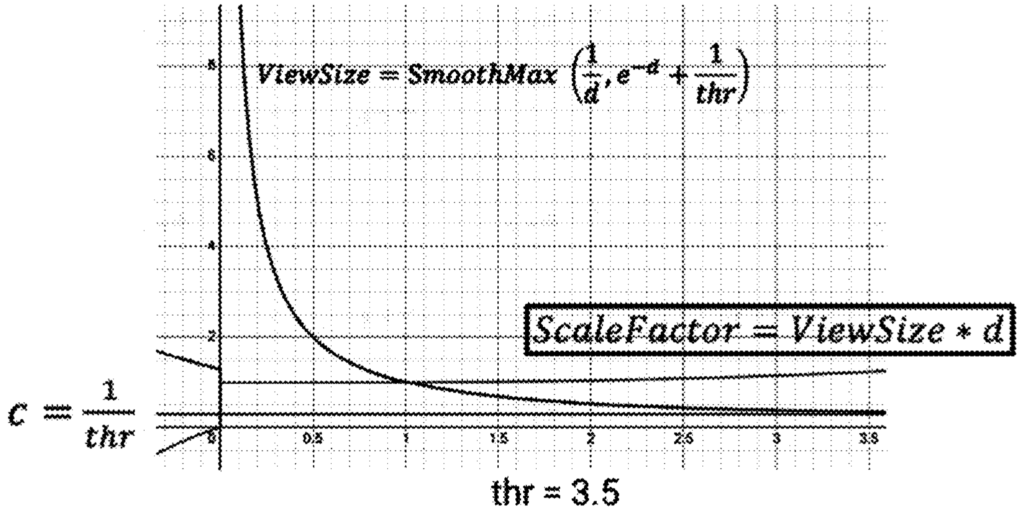
FIG. 9 is a schematic curve diagram of rescaling the size of a virtual object relative to the depth of the virtual object in an image provided by an embodiment of the present disclosure.

Optionally, referring to FIG. 9, a schematic curve diagram of rescaling the size of the virtual object relative to the depth of the virtual object in the image is provided, where the horizontal axis indicates the depth and the vertical axis indicates the size. When the pixel depth of the virtual object is less than a preset depth, there is a negative correlation between the pixel depth of the virtual object and the size of the virtual object recorded in the preset virtual object scaling relationship. When the pixel depth of the virtual object is greater than or equal to the preset depth, the virtual object recorded in the preset virtual object scaling relationship keeps a preset size, so that the virtual object can be clearly visible in the image to be rendered.

In the technical scheme according to an embodiment of the present disclosure, by determining the local lighting information and the global lighting information about an image to be rendered with a newly added virtual object, and combining the local lighting information and the global lighting information to project and render the virtual object in the image to be rendered, it is possible to not only ensure the consistency of lighting over a wide range, but also maintain obvious lighting variations at different locations, thus alleviating a problem of particularly drastic lighting variations, meanwhile there are some differences in lighting variations at different locations, so as to alleviate the problem of inconsistent shadow effects as much as possible, improve the fidelity of the inserted virtual object, and achieve a better picture realism. Moreover, by providing a three-dimensional texture mesh, the shadow shape when a virtual object is projected can be further enhanced to be more approximate to the real geometric shape.

Figure 10:
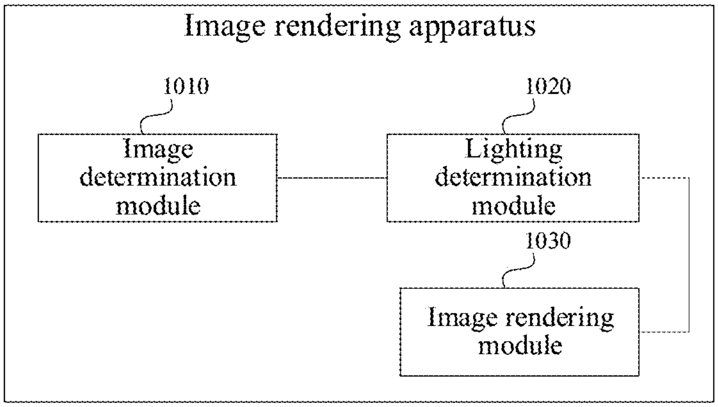
FIG. 10 is a schematic structural diagram of an image rendering apparatus provided by an embodiment of the present disclosure.

FIG. 10 is a schematic structural diagram of an image rendering apparatus provided by an embodiment of the present disclosure. The embodiment of the present disclosure is suitable for rendering and displaying a virtual object, such as a cartoon character or the like, that is newly added into an image, the image rendering apparatus can be implemented in the form of software and/or hardware, or alternatively, by an electronic device, which can be a mobile terminal, a PC terminal, or a server. As shown in FIG. 10, the image rendering apparatus according to the present embodiment may include an image determination module 1010, a lighting determination module 1020 and an image rendering module 1030. Among them:

the image determination module 1010 is configured to determine an image to be rendered, wherein a virtual object is newly added to the image to be rendered;

the lighting determination module 1020 is configured to determine local lighting information and global lighting information corresponding to the image to be rendered; and the image rendering module 1030 is configured to project and render the virtual object in the image to be rendered by combining the local lighting information with the global lighting information.

On the basis of the above embodiments, optionally, the determining local lighting information and global lighting information corresponding to the image to be rendered may include:

obtaining local lighting information corresponding to the image to be rendered through local light estimation of the image to be rendered;

identifying a target scene area from the image to be rendered and determining local lighting information of pixels in the target scene area; and performing weighted averaging on the local lighting information of pixels in the target scene area, to obtain the global lighting information corresponding to the image to be rendered.

On the basis of the above embodiments, optionally, the target scene area can be a ground area, a wall area or a top ceiling area segmented according to different scenes in the image to be rendered.

On the basis of the above embodiments, optionally, the performing weighted averaging on the local lighting information of pixels in the target scene area, to obtain the global lighting information corresponding to the image to be rendered, may include:

determining local lighting directions for the pixels in the target scene area from the local lighting information of the pixels in the target scene area;

performing weighted averaging on the local lighting directions for pixels in the target scene area to obtain a global average lighting direction corresponding to the image to be rendered; and determining the global lighting information corresponding to the image to be rendered according to the global average lighting direction corresponding to the image to be rendered, wherein the global lighting information is used for indicating generation of a global parallel light along the global average lighting direction.

On the basis of the above embodiments, optionally, the performing weighted averaging on the local lighting directions for pixels in the target scene area to obtain a global average lighting direction corresponding to the image to be rendered may include:

determining a pixel identification probability in the target scene area, wherein the pixel identification probability is a probability that a pixel is identified as a pixel belonging to the target scene area; and performing weighted averaging on the local lighting directions for pixels in the target scene area according to the pixel identification probability in the target scene area, to obtain the global average lighting direction corresponding to the image to be rendered.

On the basis of the above embodiments, optionally, the projecting and rendering the virtual object in the image to be rendered by combining the local lighting information with the global lighting information may include:

combining the local lighting information with the global lighting information by using Gamma correction to obtain joint lighting information to be adopted by the image to be rendered; and projecting and rendering the virtual object in the image to be rendered by using the joint lighting information.

On the basis of the above embodiments, optionally, the projecting and rendering the virtual object in the image to be rendered by using the joint lighting information may include:

determining pixel depth information and pixel roughness of the virtual object in the image to be rendered;

performing surface reconstruction on the virtual object according to the pixel depth information and the pixel roughness of the virtual object, to obtain a three-dimensional texture mesh corresponding to the virtual object; and projecting and rendering the virtual object in the image to be rendered using the three-dimensional texture mesh corresponding to the virtual object and the joint lighting information.

On the basis of the above embodiments, optionally, the projecting and rendering the virtual object in the image to be rendered may include:

applying lighting corresponding to the joint lighting information to the virtual object in the image to be rendered, and projecting a shadow of the virtual object on the image to be rendered.

On the basis of the above embodiments, optionally, for projecting and rendering the virtual object in the image to be rendered, the method may further include:

determining pixel depth information of the virtual object in the image to be rendered;

determining and adjusting a size matched with the virtual object according to the pixel depth information of the virtual object through a preset virtual object scaling relationship, wherein the preset virtual object scaling relationship is used for recording a correlation relationship between a size of the virtual object in the image and a pixel depth of the virtual object.

On the basis of the above embodiments, optionally, when the pixel depth of the virtual object is less than a preset depth, the size of the virtual object recorded in the preset virtual object scaling relationship is negatively correlated with the pixel depth of the virtual object; when the pixel point depth of the virtual object is greater than or equal to the preset depth, the virtual object recorded in the preset virtual object scaling relationship maintains the preset size.

The image rendering apparatus provided in the embodiment of the present disclosure can execute the image rendering method provided in any embodiment of the present disclosure, and has corresponding functions and advantageous effects of executing the image rendering method, the detailed process can refer to the related operations of the image rendering method in the previous embodiments.

It shall be noted that respective units and modules included in the above apparatus are only divided according to functional logic, but are not limited to the above division, as long as the corresponding functions can be realized; in addition, specific names of respective functional units are only for the convenience of distinguishing from each other, instead of being used to limit the protection scopes of the embodiments of the present application.

Figure 11:
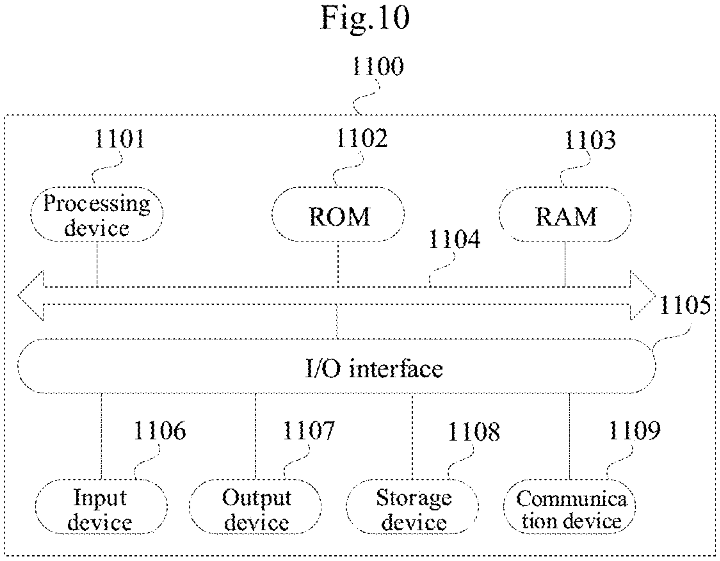
FIG. 11 is a schematic structural diagram of an electronic device for implementing an image rendering method provided by an embodiment of the present disclosure.

FIG. 11 is a schematic structural diagram of an electronic device provided by an embodiment of the present disclosure. Referring now to FIG. 11, there is shown a structural schematic diagram of an electronic device (e.g., a terminal device or a server in FIG. 7) 500 suitable for implementing an embodiment of the present disclosure. The terminal device in the embodiment of the present disclosure may include, but not limited to, mobile terminal such as mobile phone, notebook computer, digital broadcast receiver, PDA (Personal Digital Assistant), PAD (Tablet Computer), PMP (Portable Multimedia Player), vehicle-mounted terminal (such as vehicle-mounted navigation terminal), and fixed terminal such as digital TV, desktop computer or the like. The electronic device shown in FIG. 11 is just an example, and should not bring any limitation to the functions and application scopes of the embodiments of the present disclosure.

As shown in FIG. 11, the electronic device 500 may include a processing device (such as a central processing unit, a graphics processor, etc.) 1101, which may perform various appropriate actions and processes according to a program stored in a read-only memory (ROM) 1102 or a program loaded from a storage device 1108 into a random-access memory (RAM) 1103. In the RAM 1103, various programs and data required for the operation of the electronic device 1100 are also stored. A processing device 1101, a ROM 1102 and a RAM 1103 are connected to each other through a bus 1104. An editing/output (I/O) interface 1105 is also connected to the bus 1104.

Generally, the following devices can be connected to the I/O interface 1105: an input device 1106 including, for example, a touch screen, a touch pad, a keyboard, a mouse, a camera, a microphone, an accelerometer, a gyroscope, etc.; an output device 1107 including, for example, a liquid crystal display (LCD), a speaker, a vibrator, etc.; a storage device 1108 such as a magnetic tape, a hard disk, etc.; and a communication device 1109. The communication device 1109 mayallow the electronic device 1100 to communicate wirelessly or wired with other devices to exchange data. Although FIG. 11 shows an electronic device 1100 with various devices, it should be understood that it is not required to implement or have all the devices shown. Alternatively, more or fewer devices may be implemented or provided.

In particular, according to an embodiment of the present disclosure, the processes described above with reference to the flowcharts can be implemented as computer software programs. For example, an embodiment of the present disclosure includes a computer program product including a computer program carried on a non-transitory computer-readable medium, which contains program codes for executing the image rendering methods shown in the flowcharts. In such an embodiment, the computer program can be downloaded and installed from the network through the communication device 1109, or installed from the storage device 1108 or from the ROM 1102. When the computer program is executed by the processing device 1101, the above functions defined in the image rendering methods according to the embodiments of the present disclosure are executed.

Names of messages or information exchanged among multiple devices in embodiments of the present disclosure are only used for illustrative purposes, instead of being used to limit the scope of these messages or information.

The electronic device provided by the embodiment of the present disclosure belongs to the same inventive concept as the image rendering method provided by the above embodiment, and the technical details not described in detail in the present embodiment can be found in the above embodiment, and the present embodiment has the same advantageous effects as the above embodiment.

An embodiment of the present disclosure provides a computer storage medium on which a computer program is stored, which, when executed by a processor, implements the image rendering methods provided in the above embodiments.

An embodiment of the present disclosure provides a computer program that contains program codes which can be executed by a processor for executing the image rendering methods provided in the embodiments.

It should be noted that the computer-readable medium mentioned above in this disclosure can be a computer-readable signal medium or a computer-readable storage medium or any combination thereof. The computer-readable storage medium can be, for example, but not limited to, an electrical, magnetic, optical, electromagnetic, infrared, or semiconductor system, apparatus or device, or a combination of any of the above. More specific examples of computer-readable storage media may include, but not limited to, an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above. In the present disclosure, a computer-readable storage medium can be any tangible medium containing or storing a program, which can be used by or in combination with an instruction execution system, apparatus, or device.

In the present disclosure, a computer-readable signal medium may include data signals propagated in baseband or as a part of a carrier wave, in which computer-readable program codes are carried. The propagated data signals can take many forms, including but not limited to electromagnetic signals, optical signals, or any suitable combination of the above. A computer-readable signal medium can also be any computer-readable medium other than a computer-readable storage medium, which can send, propagate, or transmit a program that is used by or in connection with an instruction execution system, apparatus, or device. The program codes contained in the computer-readable medium can be transmitted via any suitable medium, including but not limited to: wires, optical cables, RF (radio frequency) and the like, or any suitable combination of the above.

In some embodiments, the client and the server can communicate by using any currently known or future developed network protocol such as HTTP (HyperText Transfer Protocol), and can be interconnected with digital data communication in any form or medium (for example, communication network). Examples of communication networks can include a local area network ("LAN"), a wide area network ("WAN"), the Internet (for example, the Internet) and an end-to-end network (for example, ad hoc end-to-end network), as well as any currently known or future developed networks.

The computer-readable medium may be included in the electronic device; or it can exist alone without being assembled into the electronic device.

The computer-readable medium carries one or more programs that, when executed by the electronic device, cause the electronic device to: determine an image to be rendered, wherein a virtual object is newly added to the image to be rendered; determine local lighting information and global lighting information corresponding to the image to be rendered; and project and render the virtual object in the image to be rendered by combining the local lighting information with the global lighting information.

Computer program codes for performing the operations of the present disclosure may be written in one or more programming languages or their combinations, including but not limited to object-oriented programming languages, such as Java, Smalltalk, C++, and conventional procedural programming languages, such as "C" language or similar programming languages. The program codes can be completely executed on the user's computer, partially executed on the user's computer, executed as an independent software package, partially executed on the user's computer and partially executed on a remote computer, or completely executed on a remote computer or server. In the case involving a remote computer, the remote computer may be connected to a user computer through any kind of network, including a local area network (LAN) or a wide area network (WAN), or may be connected to an external computer (for example, through the Internet using an Internet service provider).

The flowcharts and block diagrams in the drawings illustrate the architectures, functions, and operations of possible implementations of systems, methods, and computer program products according to various embodiments of the present disclosure. In this regard, each block in the flowcharts or block diagrams may represent a module, a program segment, or a part of codes that contains one or more executable instructions for implementing specified logical functions. It should also be noted that in some alternative implementations, the functions noted in the blocks may occur in a different order than those noted in the drawings. For example, two blocks shown in succession may actually be executed substantially in parallel, and they may sometimes be executed in a reverse order, depending on the functions involved. It should also be noted that each block in the block diagrams and/or flowcharts, and combinations of blocks in the block diagrams and/or flowcharts, can be implemented by a dedicated hardware-based system that performs specified functions or operations, or by a combination of dedicated hardware and computer instructions.

The units involved in the embodiments described in the present disclosure can be realized by software or hardware. Among them, the name of the unit does not constitute the limitation of the unit itself in some cases.

The functions as described above herein may be at least partially performed by one or more hardware logic components. For example, without limitation, exemplary types of hardware logic components that can be used may include: Field Programmable Gate Array (FPGA), Application Specific Integrated Circuit (ASIC), Application Specific Standard Product (ASSP), System on Chip (SOC), Complex Programmable Logic Device (CPLD) and so on.

In the context of this disclosure, a machine-readable medium may be a tangible medium that may contain or store a program for being used by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, device or equipment, or any suitable combination of the above. More specific examples of computer-readable storage media may include, but not limited to, an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above.

According to one or more embodiments of the present disclosure, Example 1 provides an image rendering method, including:

determining an image to be rendered, wherein a virtual object is newly added to the image to be rendered;

determining local lighting information and global lighting information corresponding to the image to be rendered; and projecting and rendering the virtual object in the image to be rendered by combining the local lighting information with the global lighting information.

According to one or more embodiments of the present disclosure, Example 2, the method of Example 1, wherein the determining local lighting information and global lighting information corresponding to the image to be rendered comprises:

obtaining local lighting information corresponding to the image to be rendered through local light estimation of the image to be rendered;

identifying a target scene area from the image to be rendered and determining local lighting information of pixels in the target scene area; and performing weighted averaging on the local lighting information of pixels in the target scene area, to obtain the global lighting information corresponding to the image to be rendered.

According to one or more embodiments of the present disclosure, Example 3, the method of Example 2, wherein the target scene area is a ground area, a wall area or a top ceiling area segmented according to different scenes in the image to be rendered.

According to one or more embodiments of the present disclosure, Example 4, the method of Example 2, wherein the performing weighted averaging on the local lighting information of pixels in the target scene area, to obtain the global lighting information corresponding to the image to be rendered, comprises:

determining local lighting directions for the pixels in the target scene area from the local lighting information of the pixels in the target scene area;

performing weighted averaging on the local lighting directions for pixels in the target scene area to obtain a global average lighting direction corresponding to the image to be rendered; and determining the global lighting information corresponding to the image to be rendered according to the global average lighting direction corresponding to the image to be rendered, wherein the global lighting information is used for indicating generation of a global parallel light along the global average lighting direction.

According to one or more embodiments of the present disclosure, Example 5, the method of Example 4, wherein the performing weighted averaging on the local lighting directions for pixels in the target scene area to obtain a global average lighting direction corresponding to the image to be rendered comprises:

determining a pixel identification probability in the target scene area, wherein the pixel identification probability is a probability that a pixel is identified as a pixel belonging to the target scene area; and performing weighted averaging on the local lighting directions for pixels in the target scene area according to the pixel identification probability in the target scene area, to obtain the global average lighting direction corresponding to the image to be rendered.

According to one or more embodiments of the present disclosure, Example 6, the method of Example 1, wherein the projecting and rendering the virtual object in the image to be rendered by combining the local lighting information with the global lighting information comprises:

combining the local lighting information with the global lighting information by using Gamma correction to obtain joint lighting information to be adopted by the image to be rendered; and projecting and rendering the virtual object in the image to be rendered by using the joint lighting information.

According to one or more embodiments of the present disclosure, Example 7, the method of Example 6, wherein the projecting and rendering the virtual object in the image to be rendered by using the joint lighting information comprises:

determining pixel depth information and pixel roughness of the virtual object in the image to be rendered;

performing surface reconstruction on the virtual object according to the pixel depth information and the pixel roughness of the virtual object, to obtain a three-dimensional texture mesh corresponding to the virtual object; and projecting and rendering the virtual object in the image to be rendered using the three-dimensional texture mesh corresponding to the virtual object and the joint lighting information.

According to one or more embodiments of the present disclosure, Example 8, the method of Example 7, wherein the projecting and rendering the virtual object in the image to be rendered comprises:

applying lighting corresponding to the joint lighting information to the virtual object in the image to be rendered, and projecting a shadow forming the virtual object on the image to be rendered.

According to one or more embodiments of the present disclosure, Example 9, the method of Example 1, wherein, for projecting and rendering the virtual object in the image to be rendered, the method further comprises:

determining pixel depth information of the virtual object in the image to be rendered;

determining and adjusting a size matched with the virtual object according to the pixel depth information of the virtual object through a preset virtual object scaling relationship, wherein the preset virtual object scaling relationship is used for recording a correlation relationship between a size of the virtual object in the image and a pixel depth of the virtual object.

According to one or more embodiments of the present disclosure, Example 10, the method of Example 9, wherein when the pixel depth of the virtual object is less than a preset depth, the size of the virtual object recorded in the preset virtual object scaling relationship is negatively correlated with the pixel depth of the virtual object; when the pixel point depth of the virtual object is greater than or equal to the preset depth, the virtual object recorded in the preset virtual object scaling relationship maintains the preset size.

According to one or more embodiments of the present disclosure, Example 11 provides an image rendering apparatus, comprising:

an image determination module configured to determine an image to be rendered, wherein a virtual object is newly added to the image to be rendered;

a lighting determination module configured to determine local lighting information and global lighting information corresponding to the image to be rendered; and an image rendering module configured to project and render the virtual object in the image to be rendered by combining the local lighting information with the global lighting information.

According to one or more embodiments of the present disclosure, Example 12 provides an electronic device comprising:

one or more processors; and a storage device for storing one or more programs, wherein the one or more programs, when executed by the one or more processors, cause the one or more processors to implement the image rendering method of any one of Examples 1 to 10.

According to one or more embodiments of the present disclosure, Example 13 provides a storage medium comprising computer-executable instructions, which, when executed by a computer processor, are used for implementing the image rendering method of any one of Examples 1 to 10.

The above descriptions are only preferred embodiments of the present disclosure and the explanation of the applied technical principles. It should be understood by those skilled in the art that the protection scope involved in the present disclosure is not limited to the technical scheme formed by a specific combination of the above technical features, but also covers other technical schemes formed by any combination of the above technical features or their equivalent features, without departing from the inventive concept of the present disclosure, for example, a technical scheme formed by exchanging the above features with technical features with similar functions disclosed in, but not limited to, this disclosure.

Furthermore, although the operations are depicted in a particular order, it should not be understood as requiring that these operations be performed in the particular order as shown or in a sequential order. Under certain scenarios, multitasking and parallel processing may be beneficial. Likewise, although several specific implementation details are contained in the above discussion, they should not be construed as limiting the scope of the present disclosure. Some features described in the context of individual embodiments can also be combined in a single embodiment. On the contrary, various features described in the context of a single embodiment can also be implemented in multiple embodiments individually or in any suitable sub-combination.

Although the subject matter has been described in language specific to structural features and/or methodological logical acts, it should be understood that the subject matter defined in the appended claims is not necessarily limited to the specific features or actions described above. On the contrary, the specific features and actions described above are only exemplary forms of implementing the claims.

What is claimed is:

1. An image rendering method, comprising:

determining an image to be rendered, wherein a virtual object is newly added to the image to be rendered;

determining local lighting information and global lighting information corresponding to the image to be rendered; and projecting and rendering the virtual object in the image to be rendered by combining the local lighting information with the global lighting information, wherein projecting and rendering the virtual object in the image to be rendered by combining the local lighting information with the global lighting information, comprises:

projecting the virtual object by using the global lighting information as a whole background, and incorporating the projection of the virtual object based on the local lighting information in the whole background to reflect a change of projection, wherein the determining local lighting information and global lighting information corresponding to the image to be rendered comprises:

obtaining local lighting information corresponding to the image to be rendered through local light estimation of the image to be rendered;

identifying a target scene area from the image to be rendered and determining local lighting information of pixels in the target scene area; and performing weighted averaging on the local lighting information of pixels in the target scene area, to obtain the global lighting information corresponding to the image to be rendered.

2. The method of claim 1, wherein the target scene area is a ground area, a wall area or a top ceiling area segmented according to different scenes in the image to be rendered.

3. The method of claim 1, wherein performing weighted averaging on the local lighting information of pixels in the target scene area, to obtain the global lighting information corresponding to the image to be rendered, comprises:

determining local lighting directions for the pixels in the target scene area from the local lighting information of the pixels in the target scene area;

performing weighted averaging on the local lighting directions for pixels in the target scene area to obtain a global average lighting direction corresponding to the image to be rendered; and determining the global lighting information corresponding to the image to be rendered according to the global average lighting direction corresponding to the image to be rendered, wherein the global lighting information is used for indicating generation of a global parallel light along the global average lighting direction.

4. The method of claim 3, wherein the performing weighted averaging on the local lighting directions for pixels in the target scene area to obtain a global average lighting direction corresponding to the image to be rendered comprises:

determining a pixel identification probability in the target scene area, wherein the pixel identification probability is a probability that a pixel is identified as a pixel belonging to the target scene area; and performing weighted averaging on the local lighting directions for pixels in the target scene area according to the pixel identification probability in the target scene area, to obtain the global average lighting direction corresponding to the image to be rendered.

5. The method of claim 1, wherein the projecting and rendering the virtual object in the image to be rendered by combining the local lighting information with the global lighting information comprises:

combining the local lighting information with the global lighting information by using Gamma correction to obtain joint lighting information to be adopted by the image to be rendered; and projecting and rendering the virtual object in the image to be rendered by using the joint lighting information.

6. The method of claim 5, wherein the projecting and rendering the virtual object in the image to be rendered by using the joint lighting information comprises:

determining pixel depth information and pixel roughness of the virtual object in the image to be rendered;

performing surface reconstruction on the virtual object according to the pixel depth information and the pixel roughness of the virtual object, to obtain a three-dimensional texture mesh corresponding to the virtual object; and projecting and rendering the virtual object in the image to be rendered using the three-dimensional texture mesh corresponding to the virtual object and the joint lighting information.

7. The method of claim 6, wherein the projecting and rendering the virtual object in the image to be rendered comprises:

applying lighting corresponding to the joint lighting information to the virtual object in the image to be rendered, and projecting a shadow of the virtual object on the image to be rendered.

8. The method of claim 1, wherein, for projecting and rendering the virtual object in the image to be rendered, the method further comprises:

determining pixel depth information of the virtual object in the image to be rendered; and determining and adjusting a size matched with the virtual object according to the pixel depth information of the virtual object through a preset virtual object scaling relationship, wherein the preset virtual object scaling relationship is used for recording a correlation relationship between a size of the virtual object in the image and a pixel depth of the virtual object.

9. The method of claim 8, wherein when the pixel depth of the virtual object is less than a preset depth, the size of the virtual object recorded in the preset virtual object scaling relationship is negatively correlated with the pixel depth of the virtual object; and when the pixel depth of the virtual object is greater than or equal to the preset depth, the virtual object recorded in the preset virtual object scaling relationship maintains a preset size.

10. An electronic device comprising:

one or more processors; and a storage device for storing one or more programs, wherein the one or more programs, when executed by the one or more processors, cause the one or more processors to implement:

determining an image to be rendered, wherein a virtual object is newly added to the image to be rendered;

determining local lighting information and global lighting information corresponding to the image to be rendered; and projecting and rendering the virtual object in the image to be rendered by combining the local lighting information with the global lighting information, wherein projecting and rendering the virtual object in the image to be rendered by combining the local lighting information with the global lighting information, comprises:

projecting the virtual object by using the global lighting information as a whole background, and incorporating the projection of the virtual object based on the local lighting information in the whole background to reflect a change of projection, wherein the determining local lighting information and global lighting information corresponding to the image to be rendered comprises:

obtaining local lighting information corresponding to the image to be rendered through local light estimation of the image to be rendered;

identifying a target scene area from the image to be rendered and determining local lighting information of pixels in the target scene area; and performing weighted averaging on the local lighting information of pixels in the target scene area, to obtain the global lighting information corresponding to the image to be rendered.

11. The electronic device of claim 10, wherein performing weighted averaging on the local lighting information of pixels in the target scene area, to obtain the global lighting information corresponding to the image to be rendered, comprises:

determining local lighting directions for the pixels in the target scene area from the local lighting information of the pixels in the target scene area;

performing weighted averaging on the local lighting directions for pixels in the target scene area to obtain a global average lighting direction corresponding to the image to be rendered; and determining the global lighting information corresponding to the image to be rendered according to the global average lighting direction corresponding to the image to be rendered, wherein the global lighting information is used for indicating generation of a global parallel light along the global average lighting direction.

12. The electronic device of claim 10, wherein the projecting and rendering the virtual object in the image to be rendered by combining the local lighting information with the global lighting information comprises:

combining the local lighting information with the global lighting information by using Gamma correction to obtain joint lighting information to be adopted by the image to be rendered; and projecting and rendering the virtual object in the image to be rendered by using the joint lighting information.

13. The electronic device of claim 10, wherein, the one or more programs, when executed by the one or more processors, cause the one or more processors to implement: for projecting and rendering the virtual object in the image to be rendered, determining pixel depth information of the virtual object in the image to be rendered; and determining and adjusting a size matched with the virtual object according to the pixel depth information of the virtual object through a preset virtual object scaling relationship, wherein the preset virtual object scaling relationship is used for recording a correlation relationship between a size of the virtual object in the image and a pixel depth of the virtual object.

14. A non-transitory computer readable storage medium comprising computer-executable instructions, which, when executed by a computer processor, cause the computer processor to implement:

determining an image to be rendered, wherein a virtual object is newly added to the image to be rendered;

determining local lighting information and global lighting information corresponding to the image to be rendered; and projecting and rendering the virtual object in the image to be rendered by combining the local lighting information with the global lighting information, wherein projecting and rendering the virtual object in the image to be rendered by combining the local lighting information with the global lighting information, comprises:

projecting the virtual object by using the global lighting information as a whole background, and incorporating the projection of the virtual object based on the local lighting information in the whole background to reflect a change of projection, wherein the determining local lighting information and global lighting information corresponding to the image to be rendered comprises:

obtaining local lighting information corresponding to the image to be rendered through local light estimation of the image to be rendered;

identifying a target scene area from the image to be rendered and determining local lighting information of pixels in the target scene area; and performing weighted averaging on the local lighting information of pixels in the target scene area, to obtain the global lighting information corresponding to the image to be rendered.

15. The non-transitory computer readable storage medium of claim 14, wherein performing weighted averaging on the local lighting information of pixels in the target scene area, to obtain the global lighting information corresponding to the image to be rendered, comprises:

determining local lighting directions for the pixels in the target scene area from the local lighting information of the pixels in the target scene area;

performing weighted averaging on the local lighting directions for pixels in the target scene area to obtain a global average lighting direction corresponding to the image to be rendered; and determining the global lighting information corresponding to the image to be rendered according to the global average lighting direction corresponding to the image to be rendered, wherein the global lighting information is used for indicating generation of a global parallel light along the global average lighting direction.

16. The non-transitory computer readable storage medium of claim 14, wherein the projecting and rendering the virtual object in the image to be rendered by combining the local lighting information with the global lighting information comprises:

combining the local lighting information with the global lighting information by using Gamma correction to obtain joint lighting information to be adopted by the image to be rendered; and projecting and rendering the virtual object in the image to be rendered by using the joint lighting information.

17. The non-transitory computer readable storage medium of claim 14, wherein, computer-executable instructions, which, when executed by a computer processor, cause the computer processor to implement: for projecting and rendering the virtual object in the image to be rendered, determining pixel depth information of the virtual object in the image to be rendered; and determining and adjusting a size matched with the virtual object according to the pixel depth information of the virtual object through a preset virtual object scaling relationship, wherein the preset virtual object scaling relationship is used for recording a correlation relationship between a size of the virtual object in the image and a pixel depth of the virtual object.

* * * * *